(12) United States Patent
Harrison

(10) Patent No.: US 8,597,521 B1
(45) Date of Patent: Dec. 3, 2013

(54) SELECTIVE REMOVAL OF SILICA FROM SILICA CONTAINING BRINES

(75) Inventor: Stephen Harrison, Benicia, CA (US)

(73) Assignee: Simbol Inc., Pleasanton, CA (US)

( * ) Notice: Subject to any disclaimer, the term of this patent is extended or adjusted under 35 U.S.C. 154(b) by 368 days.

(21) Appl. No.: 12/822,580

(22) Filed: Jun. 24, 2010

Related U.S. Application Data

(60) Provisional application No. 61/220,000, filed on Jun. 24, 2009.

(51) Int. Cl.
*B01D 21/00* (2006.01)
*B01D 21/01* (2006.01)
*C02F 1/52* (2006.01)

(52) U.S. Cl.
USPC ............ 210/722; 210/721; 210/723; 210/724

(58) Field of Classification Search
USPC ............... 210/721, 722, 723, 724; 166/305.1, 166/222, 294–295
See application file for complete search history.

(56) References Cited

U.S. PATENT DOCUMENTS

| | | | |
|---|---|---|---|
| 4,016,075 A * | 4/1977 | Wilkins | ................. 210/712 |
| 4,116,856 A | 9/1978 | Lee et al. | |
| 4,116,858 A | 9/1978 | Lee et al. | |
| 4,159,311 A | 6/1979 | Lee et al. | |
| 4,221,767 A | 9/1980 | Lee et al. | |
| 4,276,180 A * | 6/1981 | Matson | ................. 210/683 |
| 4,291,001 A | 9/1981 | Repsher et al. | |
| 4,347,327 A | 8/1982 | Lee et al. | |
| 4,348,295 A | 9/1982 | Burba, III | |
| 4,348,296 A | 9/1982 | Bauman et al. | |
| 4,348,297 A | 9/1982 | Bauman et al. | |
| 4,376,100 A | 3/1983 | Lee et al. | |
| 4,405,463 A | 9/1983 | Jost et al. | |
| 4,430,311 A | 2/1984 | Lee et al. | |
| 4,461,714 A | 7/1984 | Burba, III | |
| 4,472,362 A | 9/1984 | Burba, III | |
| 4,540,509 A | 9/1985 | Burba, III | |
| 4,727,167 A | 2/1988 | Burba, III et al. | |
| 5,015,541 A * | 5/1991 | Evans | ............................. 429/49 |
| 5,200,165 A | 4/1993 | Harper et al. | |
| 5,229,003 A | 7/1993 | Duyvesteyn | |
| 5,358,700 A | 10/1994 | Brown et al. | |
| 5,389,349 A | 2/1995 | Bauman et al. | |
| 5,427,691 A * | 6/1995 | Kuyucak et al. | ............. 210/713 |
| 5,441,712 A | 8/1995 | Duyvesteyn et al. | |
| 5,599,516 A | 2/1997 | Bauman et al. | |

(Continued)

FOREIGN PATENT DOCUMENTS

| | | |
|---|---|---|
| JP | 52009963 A * | 1/1977 |
| JP | 55031437 A * | 3/1980 |
| WO | 0078675 A1 | 12/2000 |

OTHER PUBLICATIONS

JP 52009963 A—Derwent Abstract in English.*

(Continued)

*Primary Examiner* — Bobby Ramdhanie
*Assistant Examiner* — Nader Hossaini
(74) *Attorney, Agent, or Firm* — Bracewell & Giuliani LLP; Michael Samardzija

(57) ABSTRACT

This invention relates to a method for selective removal of silica and silicon containing compounds from solutions that include silica and silicon containing compounds, including geothermal brines.

20 Claims, 4 Drawing Sheets

(56) References Cited

U.S. PATENT DOCUMENTS

| | | | |
|---|---|---|---|
| 6,017,500 | A | 1/2000 | Mehta |
| 6,080,696 | A | 6/2000 | Duke et al. |
| 6,280,693 | B1 | 8/2001 | Bauman et al. |
| 6,458,184 | B2 | 10/2002 | Featherstone |
| 6,555,078 | B1 | 4/2003 | Mehta |
| 6,682,644 | B2 | 1/2004 | Featherstone et al. |
| 2003/0226761 | A1 | 12/2003 | Featherstone et al. |
| 2004/0149590 | A1 | 8/2004 | Featherstone et al. |

OTHER PUBLICATIONS

JP 55031437 A—Derwent Abstract in English.*

Full English translation of Chiba et al (JP 55031437), "Removal of Arsenic and Silicon dioxide Contained in Industrial Waste Water", 1980, 19 pages.*

Bouguerra, W., et al., Equilibrium and kinetic studies of adsorption of silica onto activated alumina, Desalination, 2007, pp. 141-146, vol. 206, Elsevier, US.

Gallup, D. L., et al., Laboratory investigation of silica removal from geothermal brines to control silica scaling and produce usable silicates, Applied Geochemistry, 2003, pp. 1597-1612, vol. 18, Elsevier, US.

Ku, Y., et al., the Adsorption of Fluoride Ion From Aqueous Solution by Activated Alumina, Water, Air, and Soil Pollution, 2002, pp. 349-360, vol. 133, Netherlands.

Potapov, V.V., et al., Experiments on Silica Precipitation from Hydrothermal Solution and Utilization of Precipitated Material, Thirtieth Workshop on Geothermal Reservoir Engineering Stanford University, 2005, Russia.

Pyman, M.A.F., et al., the Point of Zero Charge of Amorphous Coprecipitates of Silica with Hydrous Aluminium or Ferric Hydroxide, Clay Minerals, 1979, pp. 87-92, vol. 14, Western Australia.

Sheikholeslami, J. Bright, Silica and metals removal by pretreatment to prevent fouling of reverse osmosis membranes, Desalination, 2002, pp. 255-267, vol. 143, Elsevier, US.

Yokoyama, T., et al., a Study of the Alumina-Silica Gel Adsorbent for the Removal of Silicic Acid from Geothermal Water: Increase in Adsorption Capacity of the Adsorbent due to Formation of Amorphous Aluminosilicate by Adsorption of Silicic Acid, Journal of Colloid and Interface Science, 2002, pp. 1-5, vol. 252, Elsevier Science, US.

* cited by examiner

SELECTIVE REMOVAL OF SILICA FROM SILICA CONTAINING BRINES

RELATED APPLICATIONS

This application claims priority to U.S. Provisional Patent Application Ser. No. 61/220,000, filed on Jun. 24, 2009, which is incorporated herein by reference in its entirety.

BACKGROUND OF THE INVENTION

1. Technical Field of the Invention

This invention generally relates to the field of selectively removing silica from silica containing solutions. More particularly, the invention relates to methods for the selective removal and recovery of silica and silicates from containing brines, preferably without the removal of other ions from the brines.

2. Description of the Prior Art

Geothermal brines are of particular interest for a variety of reasons. First, geothermal brines provide a source of power due to the fact that hot geothermal pools are stored at high pressure underground, which when released to atmospheric pressure, can provide a flash-steam. The flash-stream can be used, for example, to run a power plant. Additionally, geothermal brines contain useful elements, which can be recovered and utilized for secondary processes. In some geothermal waters and brines, binary processes can be used to heat a second fluid to provide steam for the generation of electricity without the flashing of the geothermal brine.

It is known that geothermal brines can include various metal ions, particularly alkali and alkaline earth metals, as well as lead, silver and zinc, in varying concentrations, depending upon the source of the brine. Recovery of these metals is potentially important to the chemical and pharmaceutical industries. Typically, the economic recovery of metals from natural brines, which may vary widely in composition, depends not only on the specific concentration of desired the desired metal, but also upon the concentrations of interfering ions, particularly silica, calcium and magnesium, because the presence of the interfering ions will increase recovery costs as additional steps must be taken to remove the interfering ions.

Silica is known to deposit in piping as scale deposits, typically as a result of the cooling of a geothermal brine. Frequently, geothermal brines are near saturation with respect to the silica concentration and upon cooling, deposition occurs because of the lower solubility at lower temperatures. This is combined with the polymerization of silica and co-precipitation with other species, particularly metals. This is seen in geothermal power stations, and is particularly true for amorphous silica/silicates. Additionally, silica is a known problem in RO desalination plants. Thus, removal of silica from low concentration brines may help to eliminate these scale deposits.

Known methods for the removal of silica from geothermal brines include the use of a geothermal brine clarifier for the removal and recovery of silica solids, that may be precipitated with the use of various seed materials, or the use of compounds that absorb silica, such as magnesium oxide, magnesium hydroxide or magnesium carbonate. In addition to a less than complete recovery of silicon from brines, prior art methods also suffer in that they typically remove ions and compounds other than just silica and silicon containing compounds.

Thus, although conventional processing of ores and brines currently employed can remove some of the silica present in silica containing solutions, there exists a need to develop methods that are selective for the removal of silica from brines and other silica containing solutions at high yields to produce solutions having reduced silica concentrations.

SUMMARY OF THE INVENTION

Methods for the selective removal of silica from silica containing solutions, such as geothermal brines, are provided.

In one embodiment, a method for removing silica from a brine solution that includes silica is provided. The method includes the steps of: providing a brine solution that includes silica; maintaining the pH of the brine solution at an adjusted pH of between about 4 and 7; contacting said brine solution with activated alumina at the adjusted pH such that silica present in the brine solution selectively binds to the activated alumina; and recovering an aqueous product stream from the contacting step, wherein the aqueous product stream has a reduced silica concentration relative to the brine solution.

In a second embodiment, a method for removing silica from an aqueous brine solution that includes silica is provided. The method includes the steps of: providing an aqueous brine solution that includes silica and an iron (II) salt; oxidizing the iron (II) salt to iron (III) hydroxide; maintaining the pH of the brine solution at between about 4.5 and 6 and contacting the silica and the iron (III) hydroxide for a time sufficient for the silica to attach to the iron (III) hydroxide and form a silica/iron precipitate; separating the silica/iron precipitate from the aqueous brine solution; and recovering an aqueous product stream from the separation step, wherein the aqueous product stream has a reduced silica concentration relative to the aqueous brine solution.

In a certain embodiments, the method further includes the steps of: maintaining the pH of the aqueous product stream at between about 4 and 7; supplying the aqueous product stream to a column charged with activated alumina at a pH of between about 4 and 7 such that silica present in the aqueous product stream selectively binds to the activated alumina; and recovering a column product stream having a reduced silica concentration relative to the aqueous product stream.

In a third embodiment, a method for removing silica from a brine solution that includes silica is provided. The method includes the steps of providing a brine solution that includes silica; contacting the brine solution with an aqueous solution, wherein the aqueous solution includes aluminum chloride to produce a second aqueous solution, said second aqueous solution including brine and aluminum chloride; adjusting and maintaining the pH of the second aqueous solution such that the pH is between about 4.5 and 5.5 to form an aluminosilicate precipitate; removing the aluminosilicate precipitate that forms from the second aqueous solution; and recovering an aqueous product stream, said aqueous product stream having a reduced silica concentration relative to the brine solution.

DETAILED DESCRIPTION OF THE INVENTION

Figure 1:
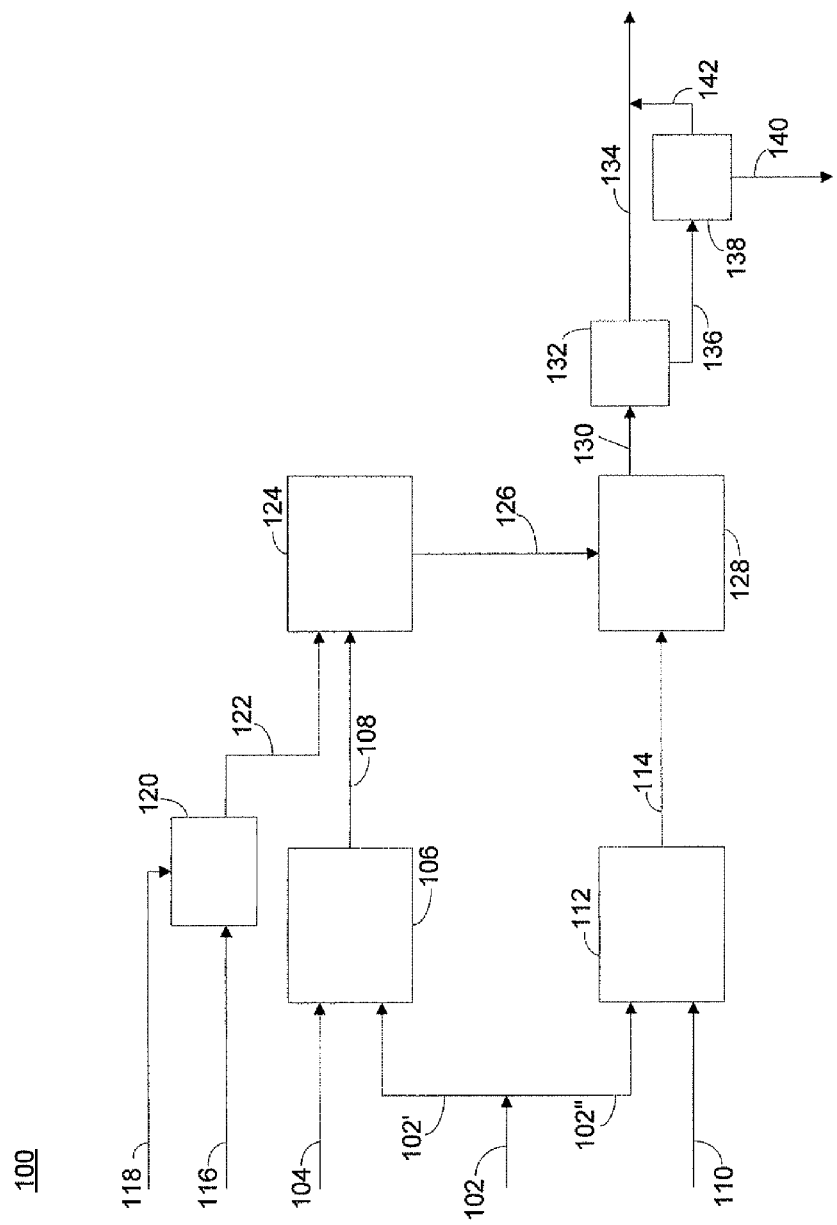
FIG. 1 provides a schematic drawing of one embodiment of the invention.

Broadly, described herein are methods for the selective removal of silica and silicates (typically reported as silicon dioxide) from solution. As used herein, the selective removal of silica generally refers to methods to facilitate the removal of silica from solutions, such as geothermal brines, Smackover brines, synthetic brines, and other brines resulting from oil and gas production, without the removal of other ions. Broadly described, in certain embodiments, the methods employ chemical means for the separation of silica.

As used herein, brine solution refers to a solution of alkali and/or alkaline earth metal salt(s) in water, wherein the concentration of salts can vary from trace amounts up to the point of saturation. Generally, brines suitable for the methods described herein are aqueous solutions that may include alkali metal or alkaline earth chlorides, bromides, sulfates, hydroxides, nitrates, and the like, as well as natural brines. In certain brines, metals may be present. Exemplary elements present in the geothermal brines can include sodium, potassium, calcium, magnesium, lithium, strontium, barium, iron, boron, silica, manganese, chlorine, zinc, aluminum, antimony, chromium, cobalt, copper, lead, arsenic, mercury, molybdenum, nickel, silver, thallium, vanadium, cesium, rubidium, and fluorine, although it is understood that other elements and compounds may also be present. Brines can be obtained from natural sources, such as, Chilean brines, Smackover brines, or Salton Sea brines, geothermal brines, sea water, mineral brines (e.g., lithium chloride or potassium chloride brines), alkali metal salt brines, and industrial brines, for example, industrial brines recovered from ore leaching, mineral dressing, and the like. The method is equally applicable to artificially prepared brine or salt solutions.

While silica removal from geothermal power plants is important as a step to reducing or preventing scale, the removal of silica is useful for many other processes, such as in the recovery of lithium from geothermal brines. Other useful processes are also known in the art. Typically, it is desired that the silica is selectively removed such that the silica can be further refined or supplied to an associated process, without the need for extensive purification thereof. Processes for the removal of silica are commonly known as silica management.

As described herein, the selective silica recovery can include the use of activated alumina, aluminum salts or iron (III) hydroxide.

In certain embodiments, the brine or silica containing solution can be filtered or treated to remove solids present prior to the selective recovery of silica.

As used herein, the simulated brine is prepared in an attempt to simulate the brine composition of various Hudson Ranch test wells found in the Salton Sea (Calif, U.S.). Generally, the simulated brine has a composition of about 260 ppm lithium, 63,000 ppm sodium, 20,100 ppm potassium, 33,000 ppm calcium, 130 ppm strontium, 700 ppm zinc, 1700 ppm iron, 450 ppm boron, 54 ppm sulfate, 3 ppm fluoride, 450 ppm ammonium ion, 180 ppm barium, 160 ppm silicon dioxide, and 181,000 ppm chloride. Additional elements, such as manganese, aluminum, antimony, chromium, cobalt, copper, lead, arsenic, mercury, molybdenum, nickel, silver, thallium, and vanadium, may also be present in the brine. It is understood, however, that the methods described herein can be used to remove silica from brines and other silica containing solutions having silica concentrations greater than 160 ppm. In certain embodiments, the brine or silica containing solution can have a silica concentration of greater than about 400 ppm, greater than 500 ppm, or greater than 600 ppm. In certain instances, geothermal brines can have silica concentrations of between about 400 and 600 ppm.

Selective Silica Recovery by Precipitation with Aluminum Salts

The addition of aluminum salts, such as $AlCl_3$, to the brine at a pH of between about 4 and 6, result in the formation of charged polymers, such as $Al_{13}O_4(OH)_{24}^{7+}$, which are highly reactive with respect to silica, resulting in the formation of amorphous aluminosilicate precipitates, which can be removed by filtration. In certain embodiments, any silica present in the brine will react with the positively charged polymer to form an amorphous aluminosilicate precipitate, thereby reducing the silica concentration of the brine. In certain embodiments, the brine can be seeded with an aluminosilicate precipitate, which allows the silica to attach to the seed material, thereby allowing the silica and aluminum polymer to be removed by conventional filtration or clarification processes. Typically, the aluminum polymers do not react with other components in the brine, such as lithium or iron, and thus they stay in solution while the silica forms the precipitate.

Silica can be selectively recovered from silica containing solutions by contacting with aluminum salts, particularly aluminum halides, such as chlorides and bromides and maintaining a pH of between about 4 and 6, preferably between about 4.5 and 5.5, more preferably between about 4.75 and 5.25, and even more preferably between about 4.85 and 5.15. Generally, the brine solution, as prepared, has a measured pH of between about 5.1 and 5.3, which is comparable to the brines of the Salton Sea, which typically have a measured pH of between about 4.9 and 5.1. Aluminum salt is added in a molar ratio of aluminum salt to silica of at least about 0.25:1, preferably at least about 0.5:1, and more preferably at least about 1:1. In certain embodiments, the aluminum salt to silica ratio is between about 0.5:1 and 2:1. Optionally, the solution can be heated. In certain embodiments, the solution can be heated to a temperature greater than about 50° C., more preferably at least about 75° C., and even more preferably at least 90° C. Optionally, the silica containing solution is seeded with between about 0.1 and 10% by weight of an amorphous aluminosilicate solid. In certain embodiments, the solution is seeded with between about 1 and 2% by weigh of the amorphous aluminosilicate solid. In certain other embodiments, the solution is seeded with between about 1.25 and 1.75% by weight of the amorphous aluminosilicate solid.

The addition of, for example, aluminum chloride to an aqueous silica solution typically lowers the pH (i.e., acidifies) of the silica containing solution as the addition results in the production of aluminum hydroxide and hydrochloric acid. Typically, the pH is monitored during the process to maintain at a constant pH. In certain embodiments, base (for example, sodium hydroxide, calcium hydroxide, and the like) can be added to the silica containing solution to maintain the pH of the solution between about 4 and 6, between about 4.5 and 5.5, and preferably at or about 5.

In certain embodiments, the addition rate of the base is near stoichiometric. In certain embodiments, the equipment can be designed to include control equipment such that base addition is a controlled process based upon at least a stoichiometric amount of base is added to the solution, based upon the amount of silica and $AlCl_3$ present in solution.

In certain embodiments, the amorphous aluminosilicate solid for use as the seed material can be prepared in a laboratory setting. Aluminum salt can be added to a concentrated sodium silicate solution that may optionally be heated, neutralized to a pH of between about 4 and 6 and stirred to form a precipitate. The precipitate is collected, washed and dried.

Precipitation of the amorphous aluminosilicate with an aluminum salt is capable of removing at least 75% of the silica present in the silica containing solution, preferably at least 90%, and even more preferably at least about 95% of the silica present in the silica containing solution. In certain embodiments, precipitation of silica from a silica containing solution with an aluminum salt results in a total silica concentration in the resulting solution of less than about 15 ppm, preferably less than about 10 ppm and even more preferably less than about 5 ppm.

In one embodiment, the resulting amorphous aluminosilicate precipitate is removed from the solution by filtration, dried and recycled as seed material for subsequent precipitation of silica. In other embodiments, the aluminosilicate precipitate is supplied to a subsequent process for recovery of silica and/or aluminum.

In certain embodiments, contacting the silica containing solution with an aluminum halide at a pH of between 4 and 6 can result in the formation of a gel, which can be subsequently separated from the remaining aqueous solution by filtration, which can be aided by the use of a centrifuge.

In certain embodiments, precipitation occurs by adding a seed containing solution to the brine solution, contacting the mixture with aluminum chloride, and then contacting the resulting mixture with a base, such as NaOH or $Ca(OH)_2$. In other embodiments, the brine is contacted with $AlCl_3$, and the resulting mixture is contacted with a base. In yet other embodiments, the brine is contacted with $AlCl_3$, the mixture is then contacted with a seed containing solution, and the resulting mixture is then contacted with a base. Finally, in certain embodiments, the brine is first contacted with $AlCl_3$, contacting the mixture with a base, and then contacting the resulting mixture with a seed containing solution.

Referring now to FIG. 1, apparatus 100 for the removal of silica from a silica containing brine is provided. Water is provided via line 102. First water stream 102' is supplied to first mixer 106, where the water is mixed with base 104, for example NaOH (caustic soda) or $Ca(OH)_2$ (slaked lime), to produce aqueous base stream 108. First mixer 106 can include any known means for mixing the base and water to form a homogeneous stream. Second water stream 102" is supplied to second mixer 112 where the water is combined with flocculent 110 to produce mixed flocculent stream 114. Exemplary flocculents include, but are not limited to, Magnafloc 351, Nalco 9907, 9911, 9913, 8181, 7193, 8170, and the like.

Brine 116 is supplied to third mixer 120 where it is combined with aluminum chloride ($AlCl_3$) containing stream 118 to produce mixed brine stream 122. Aqueous base stream 108 is combined with mixed brine stream 122 in fourth mixer 124 to produce basic brine stream 126. Basic brine stream 126 is supplied to fifth mixer 128 where it is combined and intimately mixed with mixed flocculent stream 114 to coagulate at least a portion of the silica present in brine stream 116 as an aluminosilicate solid. Mixed stream 130 comprising a low silica brine and solids is supplied to clarifier 132 to produce low silica brine stream 134 and slurry stream 136, which can include aluminosilicate precipitate. Clarifer 132 can be a settling tank or like device that can be utilized for the separation of a liquid stream from a slurry. Slurry stream 136 can be supplied to filter 138, which separates the slurry into a solid aluminosilicate precipitate, which can be removed via solid removal line 140, and a treated brine stream 142. Treated brine stream 142 can then be recombined with low silica brine stream 134.

Fifth mixer 128 can include multiple stages. In a first embodiment, fifth mixer 128 includes three reactor stages wherein the first reactor stage includes a mixer to facilitate intimate mixing of the brine, and the aluminum salt, to produce a solid aluminosilicate solid. The second reactor stage can include means for introducing the base, such as NaOH or $Ca(OH)_2$ to the reaction mixture. The second reactor stage can optionally include means for determining the pH of the solution, and control means, such as automated valves, operable to control the addition of the base to the solution to maintain a desired predetermined pH. In certain embodiments, the second reactor stage can include means for adding an aluminum salt to the solution. The third reactor stage can include means for stabilizing the pH of the solution, and means for supplying a buffer to the solution. In certain embodiments, the third reactor stage can include means for adding an aluminum salt to the solution.

Clarifier 132 can be a vessel and can include valves and lines configured to facilitate the removal of an aluminosilicate slurry from the bottom of the vessel and a low silica concentration brine stream from a position at the midpoint or top of the vessel. In certain embodiments, fifth mixer 128 or clarifier 132 can include a line for supplying a portion of the aluminosilicate precipitate the basic brine stream 108 as seed. In certain embodiments, fifth mixer 128 can include a line for supplying a low silica concentration brine stream to brine stream 116.

The mixers used herein can each separately be a series of continuously stirred reactors. In certain embodiments, fourth mixer 124 can include at least one pH meter, wherein the feed of the aqueous base stream 108 and brine stream 112 are regulated to maintain a desired pH.

Selective Silica Recovery by Precipitation with Iron

In another embodiment, silica can removed by contacting with iron (III) hydroxide at a pH of between about 4.5 and 6, preferably between about 4.75 and 5.5, more preferably between about 4.9 and 5.8, even more preferably at a pH of between about 5.3 and 5.5.

The synthetic brine is prepared having the approximate composition provided herein for the simulated Hudson Ranch test wells, and further including about 1880 ppm manganese. In certain embodiments, the brine will have an iron (II) salt present naturally. In other embodiments, an iron (II) salt or iron (III) hydroxide can be added to the brine to achieve a certain concentration of iron (II) salt or iron (III) hydroxide relative to the silica or silicon containing compounds present in the brine. In certain embodiments, the molar ratio of the iron (II) salt or iron (III) hydroxide to silica is at least 1:1, preferably at least 4:1, more preferably at least 7:1 and even more preferably at least 10:1.

When the iron in the brine or silica containing solution is iron (II), for example iron (II) chloride, an oxidant is added to oxidize iron (II) salt to iron (III) hydroxide. Exemplary oxidants include hypohalite compounds, such as hypochlorite, hydrogen peroxide, air, halogens, chlorine dioxide, chlorite, chlorate, perchlorate and other analogous halogen compounds, permanganate salts, chromium compounds, such as chromic and dichromic acids, chromium trioxide, pyridinium chlorochromate (PCC), chromate and dichromate compounds, sulfoxides, persulfuric acid, nitric acid, ozone, and the like. While it is understood that many different oxidants can be used for the oxidation of iron (II) to iron (III), the use of oxygen or air as the oxidant in the pH range of between 2 and 6 is selective for the oxidation of the iron (II) salt to iron (III) hydroxide, and generally does not result in the precipitation or oxidation of other elements or compounds present in the brine. In one preferred embodiment, the iron (II) salt is oxidized to iron (III) by sparging the reaction vessel with air. It will be recognized by those skilled in the art that iron (III) hydroxide may also have a significant affinity for arsenic (III)

and (V) oxyanions, and these anions, if present in the brine, may be co-deposited with the silica on the iron (III) hydroxide.

In another embodiment, iron (III) hydroxide can be produced by adding a solution of iron (III) chloride to the brine, which upon contact with the more neutral brine solution, will precipitate as iron (III) hydroxide. The brine will require subsequent neutralization with base to initiate precipitation. In certain embodiments, iron (III) hydroxide can be contacted with lime to form insoluble ferric hydroxide solids, which are adsorbed with silica.

The iron (III) hydroxide contacts the silica present in the silica containing solution, thereby forming a precipitate. Without being bound to any specific theory, it is believed that the silica or silicon containing compound attaches to the iron (III) hydroxide. In certain embodiments, the ratio of iron (III) to silica is at least about 1:1, more preferably at least about 4:1, more preferably at least about 7:1. The reaction of the iron (III) hydroxide with silica is capable of removing at least about 80% of the silica present, preferably at least about 90%, and more preferably at least about 95%, and typically depends upon the amount of iron (III) hydroxide present in the solution.

In certain embodiments, the pH is monitored continually during the reaction of iron (III) with silica and acid or base is added, as needed, to maintain the pH the desired level, for example, between about 4.9 and 5.3. In certain embodiments, a pH of at least 5.2 is maintained. In alternate embodiments, a pH of between about 5.15 and about 5.3 is maintained. In certain embodiments, a pH sensor that is electronically coupled to means for the addition of acid or base, and the pH is maintained at a desired pH.

In certain embodiments, the iron (II) salt containing solution is sparged with air for a period of at least about 10 min, alternatively at least about 15 min., alternatively at least about 20 min, and preferably at least about 30 min., followed by the addition of a base, such as calcium oxide, calcium hydroxide, sodium hydroxide, or the like, to achieve the desired pH for the solution.

In certain embodiments, a flocculent can be added the brine solution, in addition to the base, to facilitate the production of larger solids for easier solid/liquid separation. In certain embodiments, iron (III) silicate solids can be added to the solution to increase the rate of precipitation of silicates.

Figure 2:
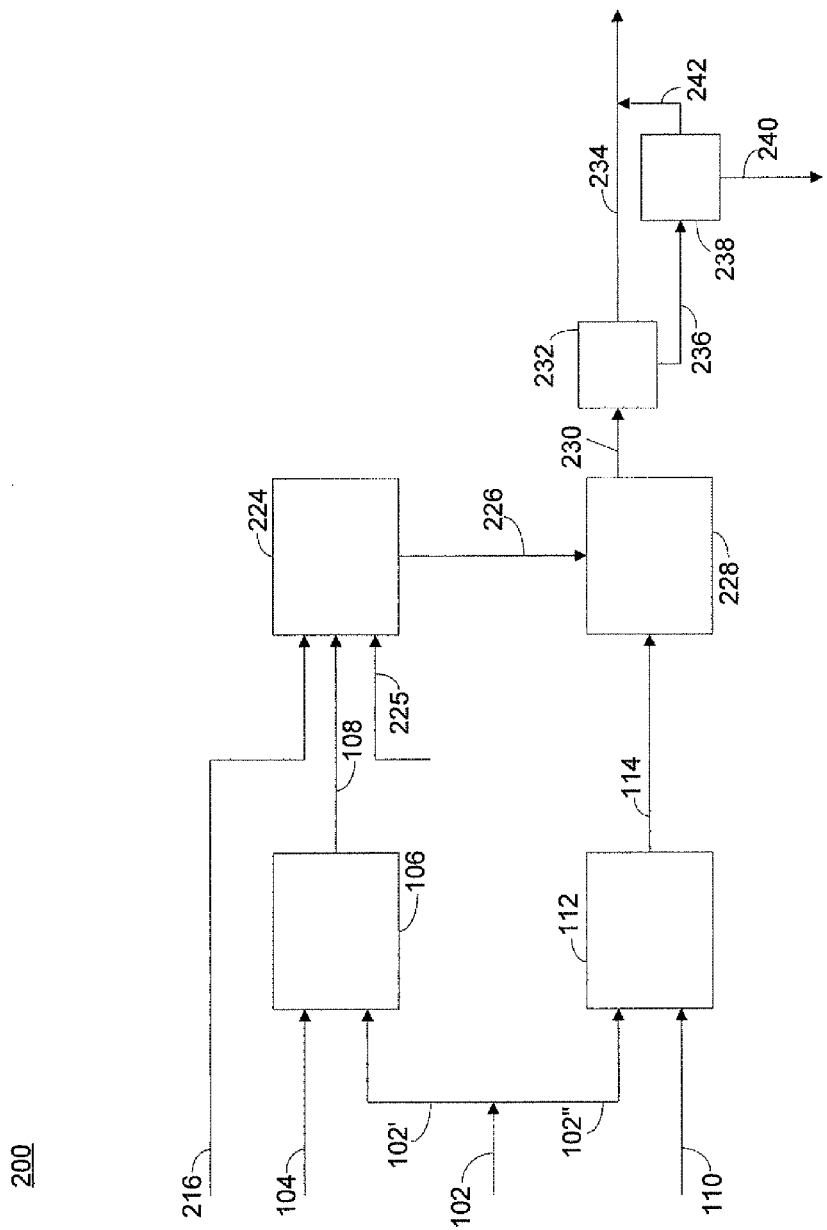
FIG. 2 provides a schematic drawing of another embodiment of the invention.

Referring now to FIG. 2, apparatus 200 for the removal of silica from a silica containing brine is provided. Water is provided via line 102. First water stream 102' is supplied to first mixer 106, where the water is mixed with base 104, for example NaOH (caustic soda) or $Ca(OH)_2$ (slaked lime), to produce aqueous base stream 108. First mixer 106 can include any known means for mixing the base and water to form a homogeneous stream. Second water stream 102" is supplied to second mixer 112 where the water is combined with flocculent 110 to produce mixed flocculent stream 114.

Brine 216 is supplied to third mixer 224 where it is combined with aqueous base stream 108 and air 225 to produce mixed brine stream 226, and iron-silica precipitates. Mixed brine stream 226 is supplied to fourth mixer 228 where it is combined and intimately mixed with mixed flocculent stream 114 to further encourage precipitation at least a portion of the silica present in brine stream 116. Mixed stream 230 comprising a low silica brine and solids is supplied to clarifier 232 to produce low silica brine stream 234 and slurry stream 236, which can include iron-silica precipitates. Clarifer 232 can be a settling tank or like device that can be utilized for the separation of a liquid stream from a slurry. Slurry stream 236 can be supplied to filter 238, which separates the slurry into a solid precipitate, which can be removed via solid removal line 240, and a treated brine stream 242. Solids removed via solid removal line 240 can optionally be separated from any remaining liquid by centrifugation. Treated brine stream 242 can then be recombined with low silica brine stream 234. Optionally, treated brine stream 242 can be recycled to third mixer 224, or alternatively can be combined with brine stream 226.

Fourth mixer 228 can include multiple stages. In a first embodiment, fourth mixer 228 includes three reactor stages wherein the first reactor stage includes a mixer to facilitate intimate mixing of the brine, and air. In preferred embodiments, sufficient air is supplied to the reactor to oxidize at least a portion of the iron (II) present to iron (III). The second reactor stage can include means for introducing the base, such as NaOH or $Ca(OH)_2$ to the reaction mixture. The second reactor stage can optionally include means for determining the pH of the solution, and control means, such as automated valves, operable to control the addition of the base to the solution to maintain a desired predetermined pH. In certain embodiments, the third reactor stage can include means for adding an aluminum salt to the solution. Optionally, apparatus 200 can include means for supplying air to the second and third reactor stages.

In certain embodiments, the brine is supplied to the first reactor stage at a pH of about 4.9 to 5.1 and a temperature of about 95° C. to 110° C. where it is contacted and sparged with air to produce certain iron (III) hydroxides. Preferably, a sparging diffuser is utilized to facilitate contact between the air and iron (II) contained within the brine. At a temperature of greater than about 90° C., the pH of the first reactor stage is controlled such that the pH is at least about 2.5.

In certain embodiments, the in the second reactor stage, the addition of lime with the iron (III) hydroxides entrained in solution to produce iron (III) hydroxides adsorbed with silica. The pH of the second stage of the reactor is maintained such that the pH of no greater than about 6, alternatively not greater than about 5.4, preferably not above about 5.3, and more preferably not above about 5.2. Additional air can be fed to the second reactor stage through a sparger, such as an air diffuser, to facilitate the preparation and precipitation of iron (III) hydroxides adsorbed with silica.

In certain embodiments, the third reactor stage can serve as a buffer tank that is configured to maintain the pH of the solution at a pH of no greater than about 6, alternatively not greater than about 5.4, preferably not greater than about 5.3, and even more preferably at a pH of not greater than about 5.2. Optionally, the third reactor stage can include an air sparger, such as an air diffuser, to facilitate preparation and precipitation of iron (III) hydroxides adsorbed with silica.

Clarifier 232 can be a vessel and can include valves and lines configured to facilitate the removal of an iron-silica slurry from the bottom of the vessel and a low silica concentration brine stream from a position at the midpoint or top of the vessel. In certain embodiments, fourth mixer 228 or clarifier 232 can include a line for supplying a portion of the iron-silica precipitate the basic brine stream 108 as seed. Alternatively, clarifier 232 can include one or more line configured to deliver iron (III) hydroxide precipitate material adsorbed with silica to one or more of the first, second, or third reactor stages. In certain embodiments, fourth mixer 228 can include a line for supplying a low silica concentration brine stream to basic brine stream 116.

In certain embodiments, apparatus 200 can include control means for controlling the addition of base to third mixer 224.

In alternate embodiments, apparatus 200 can include control means for controlling the addition of base to the second reactor stage.

In certain embodiments, brine stream 216 can be preconditioned by sparging the brine stream with air prior to supplying the brine to third mixer 224.

The mixers used herein can each separately be a series of continuously stirred reactors. In certain embodiments, third mixer 224 can include at least one pH meter, wherein the feed of the aqueous base stream 108 and brine stream 112 are regulated to maintain a desired pH.

In certain embodiments, precipitation of silica and iron hydroxide can be achieved by recycling precipitate from the clarifier 232 to reactor 224, resulting in an increase of the size of ferrosilicate particles. Additional recycling can also be achieved by mixing the seeds from clarifier 232 to first mixer 106, where base 104 is mixed with some or all of the seeds to promote the formation of a densified seed, which can then be fed to third mixer 224. This recycling step can enhance the quality of the precipitate by increasing density of the precipitate, thus making the design of clarifier 232 smaller and simpler. It has also surprisingly been found that despite the precipitation of some zinc and manganese in vessel 106 that on the introduction of these solids to the reaction vessel that a minor amount of the zinc and/or manganese is retained in the precipitate. In certain embodiments, when seeds are re-introduced into third mixer 224, there is no or minimal net loss of zinc and manganese that may be present in the brine, and the ability of the ferrosilicate precipitate to grow and capture silica is unimpaired.

Selective Silica Recovery with Activated Alumina

Activated alumina ($\gamma$-$Al_2O_3$) is known as an absorbent for silica. Specifically, activated alumina has been utilized in the removal of silica from raw water, such as is fed to a boiler. However, until now, activated alumina has not been used for the removal of silica from brine solutions, wherein the removal of the silica does not also result in the removal of other ions or compounds. Put different, until now, methods have not been reported for the removal of silica from brine solutions without concurrent removal of other ions or compounds.

Activated alumina is a known absorbent for organic and inorganic compounds in nonionic, cationic and anionic forms. Indeed, activated alumina is a common filter media used in organic chemistry for the separation and purification of reaction products.

Thus, in another embodiment of the present invention, silica is removed by contacting with activated alumina at a pH of between about 4.5 and 7, preferably between about 4.75 and 5.75, more preferably between about 4.8 and 5.3. The activated alumina preferably has a BET surface area of between about 50 and 300 $m^2/g$. In certain embodiments, the silica containing solution is combined and stirred with activated alumina to selectively remove the silica. In alternate embodiments, the activated alumina is added to the solution and stirred to selectively remove silica and silicon containing compounds. In certain embodiments, the pH of the solution is maintained at between about 4.5 and 8.5, preferably between about 4.75 and 5.75, and more preferably between about 4.8 and 5.3, during the step of contacting the silica with the activated alumina. A pH meter can be used to monitor the pH before, during and after the contacting step. In certain embodiments, the pH is controlled by titrating the solution with a strong base, such as for example sodium hydroxide. In one exemplary embodiment, a 0.1M solution of sodium hydroxide is used to adjust the pH of the reaction, although it is understood that a base of higher or lower concentration can be employed.

Regeneration of the activated alumina can be achieved by first washing the alumina with a strong base, for example, a sodium hydroxide solution of at least 0.01 M, followed by the subsequent washing with a strong acid, for example, a hydrochloric acid solution of at least 0.01 M. In some embodiments, regeneration is followed by treatment with a sodium fluoride solution having a pH of between about 4 and 5, to completely recover the capacity of the activated alumina. Optionally, the column can be rinsed with water, preferably between 1 and 5 volumes of water, prior to contacting with sodium hydroxide.

In certain embodiments, wherein the silica containing solution is contacted with the activated alumina in a column, the solution exiting the column can be monitored to determine loading of the activated alumina.

Figure 3:
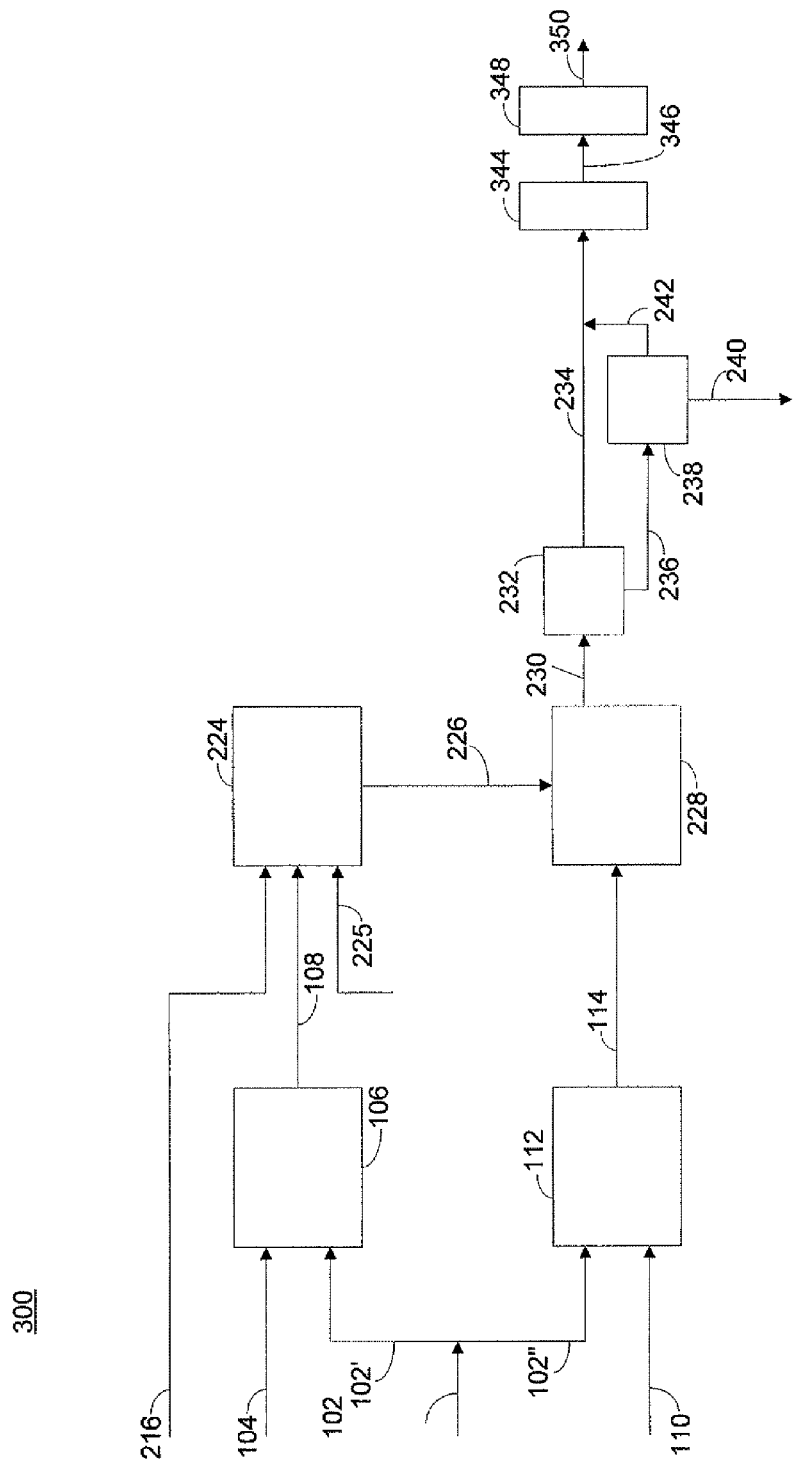
FIG. 3 provides a schematic drawing of another embodiment of the invention.

FIG. 3 shows an embodiment that incorporates removal of silica by precipitation with $AlCl_3$, as shown in FIG. 2, followed by removal of any remaining silica by absorbance with activated alumina. Specifically, low silica brine stream 234 can be supplied to first adsorbent column 344, which is charged with activated alumina and is operable to remove at least a portion of the silica present in the low silica brine stream. Treated stream 346 is then supplied to a second adsorbent column 348, which is similarly charged with activated alumina and is operable to remove at least a portion of the silica present in the treated stream, to produce product stream 350, which has a silica content that is lower than that of the low silica brine stream 234. In embodiments wherein treated stream 346 includes a measurable concentration of silica, second adsorbent column 348 is operable to produce a product stream 350 having a lower silica concentration than that of the treated stream.

Figure 4:
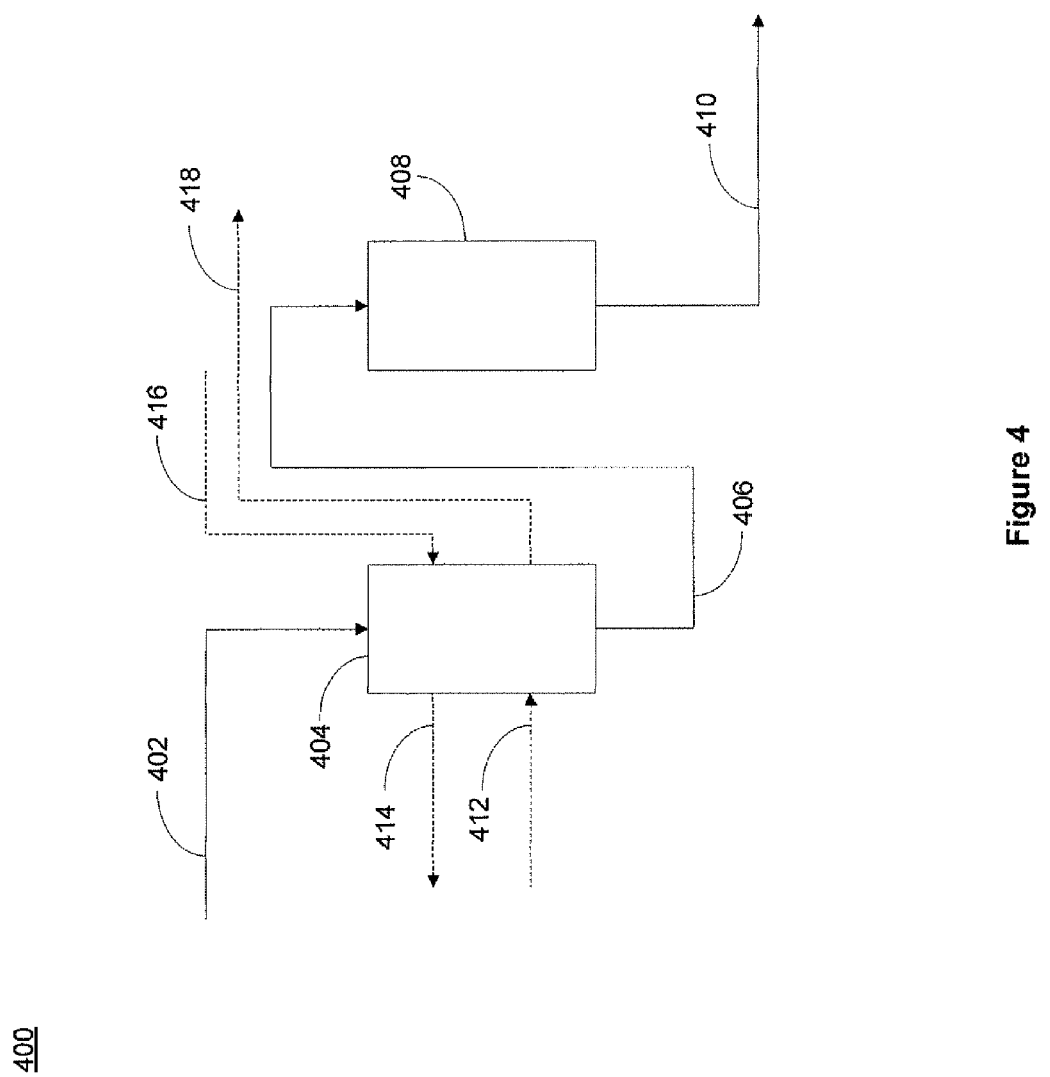
FIG. 4 provides a schematic drawing of another embodiment of the invention.

Referring to FIG. 4, apparatus 400 for the removal of silica by absorbance with activated alumina is provided. A silica containing solution or silica containing brine is supplied via line 402 to first adsorbent column 404, which is charged with activated alumina and is operable to remove at least a portion of the silica present in the brine or other solution and produce treated stream 406 having a reduced silica content relative to that of the stream being fed through line 402. Treated stream 406 can then be supplied to a second adsorbent column 408, which can also be charged with an activated alumina adsorbent which is operable to remove at least a portion of the silica present in treated stream 406 to produce a product stream 410 having a reduced silica content relative to the silica containing solution or silica containing brine supplied via line 402, and in certain embodiments, relative to treated stream 406.

In certain embodiments, regenerant solution 412 can be supplied to first adsorbent column 404. Regenerant solution 412 can be a strong base, and can be supplied to remove silica adsorbed onto the activated alumina. Waste stream 414 is configured to provide means for the removal of the regenerant solution and any silica removed from the activated alumina. Optionally, as noted above, a strong acid can be supplied to first adsorbent column 404 after the regenerant solution, and/or a sodium fluoride solution can be supplied to the column. While FIG. 4 shows that regenerant solution 412 is supplied at the bottom of adsorbent column 404 and flows in a counter-current flow, it is understood that the regenerant solution can also be supplied such that it flows in a co-current flow.

In certain embodiments, wash water 416, such as deionized water, can be supplied to adsorbent column 404 and a wash water waste stream 418 can be removed from the column. While the wash water is shown as being supplied in a co-current flow, it is understood that the wash water can be supplied in a counter-current flow.

In certain embodiments, apparatus 400 can include more than two adsorbent columns. In certain methods wherein three or more columns are included in the apparatus, only two adsorbent columns are utilized at any one time. When the activated alumina of one column begins to lose efficiency (i.e., when silica has become adsorbed to a major portion of the activated alumina such that the increasing amounts of silica are not removed by the column), that column can be removed from service and a third column can be employed. When the column is removed from service, it can be regenerated, as described above, and returned to service when the efficiency of the second column decreases, thereby indicating the adsorbent in the second column is losing effectiveness. In this manner, apparatus 400 can be run continuously as two columns can be employed for the removal of silica while a third column is regenerated.

In certain embodiments, a brine, such as a geothermal brine, can be supplied to a process designed to remove a significant portion of silica present in the brine as a precursor step to the subsequent recovery of valuable metals, such as, lithium, zinc, and manganese. Exemplary methods for the reduction of the silica concentration include those described herein. The remaining solution that includes a brine solution having a reduced silica concentration can then be supplied to an associated process that is designed to selectively remove one or more metal from the remaining solution. Optionally, the process for the removal of silica can also include the removal of iron.

In certain embodiments, the remaining solution can be supplied to a process designed to selectively remove and recover lithium. Certain methods for the recovery are known in the art, such as is described in U.S. Pat. Nos. 4,116,856; 4,116,858; 4,159,311; 4,221,767; 4,291,001; 4,347,327; 4,348,295; 4,348,296; 4,348,297; 4,376,100; 4,430,311; 4,461,714; 4,472,362; 4,540,509; 4,727,167; 5,389,349; 5,599,516; 6,017,500; 6,280,693; and 6,555,078. Alternatively, methods can be employed utilizing a lithium aluminate intercalate/gibbsite composite material, a resin based lithium aluminate intercalate, and a granulated lithium aluminate intercalate. Preferably, recovery of lithium occurs without the co-precipitation of other metals.

In certain embodiments, the remaining solution can be supplied to a process designed to selectively remove and recover at least one of manganese and zinc. In a first embodiment, the pH of the solution can be adjusted to selectively precipitate zinc and/or manganese. Following precipitation of zinc and/or manganese, the solids can be separated from the solution by known filtration means.

Separation of the zinc and manganese solids can be achieved by dissolving the solids in acid, followed by selective recovery of either zinc or manganese. In certain embodiments, manganese can be oxidized to precipitate a manganese solid, which can be separated by filtration. Zinc remaining in solution can be recovered by electrochemical means.

Alternatively, zinc and/or manganese can be selectively removed by extraction. In certain embodiments, zinc and manganese can be separately recovered by individual extractions, or by double extraction. In certain embodiments, zinc and manganese can each selectively be recovered by electrochemical means.

Known methods for the recovery of zinc that can be used for recovery from brine solutions are described in U.S. Pat. Nos. 5,229,003; 5,358,700; 5,441,712; and 6,458,184.

Known methods for the recovery of manganese that can be used for recovery from brine solutions are described in U.S. Pat. No. 6,682,644; and U.S. Pub. Pat. App. Nos. 2003/0226761; and 2004/0149590.

EXAMPLES

1. Selective Removal of Silica Using Aluminum Salts

A simulated brine was prepared to simulate the brine composition from exemplary Salton Sea deep test wells (post reactor crystallizer clarifier system), having an approximate composition of 260 ppm (mg/kg) lithium, 63,000 ppm sodium, 20,100 ppm potassium, 33,000 ppm calcium, 130 ppm strontium, 700 ppm zinc, 1700 ppm iron, 450 ppm boron, 54 ppm sulfate, 3 ppm fluoride, 450 ppm ammonium ion, 180 ppm barium, 160 ppm silica (measured as silicon dioxide), and 181,000 ppm chloride. The silica was added to the brine as acidified sodium silicate solution, with the target of a concentration of about 160 ppm, the anticipated value for the Hudson Ranch test well brine, after undergoing a clarifying process to partially remove silica. The pH of the simulated brine is between about 3 and 4, and is subsequently adjusted with sodium hydroxide or other suitable base.

Aluminum salt is added to a slurry that includes an amorphous aluminosilicate material prepared by neutralizing a concentrated sodium silicate solution with an aluminum chloride salt. Specifically, 710 g of $Na_2SiO_3.9H_2O$ is dissolved in 400 mL of distilled water. To the solution, 420 g of $AlCl_3$ was slowly added while stirring to produce a wet paste of precipitated material. The paste was dried at 60° C. in an oven overnight and washed with Milli-Q water to remove fines to produce a solid. The resulting solid was relatively insoluble (relative to pure amorphous silica) and suitable for use as a seed material for subsequent silica removal tests.

Approximately 1.6 mL of a 0.1M solution of $AlCl_3$ was added to approximately 60 mL of the simulated brine solution, which had an initial silica concentration of about 160 ppm and a pH of about 5. Approximately 1.5% by weight (relative to the total mass) of solid amorphous aluminosilicate was added to the solution. The $AlCl_3$ was slowly added in an amount equal to the molar amount of silica in solution to achieve a ratio of silica to aluminum of about 1:1. The solution was heated to approximately 95° C. and stirred constantly. The pH was monitored and adjusted by titrating with sodium hydroxide or calcium hydroxide to maintain the starting pH of about 5. The solution was allowed to stir for approximately 10 min., during which time the silica and aluminum react to selectively precipitate on the seed material, thereby removing both aluminum and silica from the solution. The monomeric silica content (i.e., non-amorphous aluminosilicate content) drops to approximately 25-40 ppm upon addition of base to maintain the pH at about 5. An additional 5-15% of the silica present precipitated over the next 30 min. Total silica removal for the process after 15 min. of stirring was about 95%, resulting in a brine solution having a silica content of approximately 10 ppm. The aluminum concentration of the solution, after precipitation of the silica, was between about 2-10 ppm.

2. Selective Removal of Silica Using Ferrous Iron

A simulated brine was prepared to simulate the brine composition of Hudson Ranch test wells, having an approximate composition of 252 ppm lithium, 61,900 ppm sodium, 20,400 ppm potassium, 33,300 ppm calcium, 123 ppm strontium, 728 ppm zinc, 1620 ppm iron, 201 ppm boron, 322 ppm sulfate, 3 ppm fluoride, 201 ppm barium, 57 ppm magnesium, 1880 ppm manganese, 136 ppm lead, 6 ppm copper, 11 ppm arsenic, 160 ppm silicon dioxide, and 181,000 ppm chloride. The simulated brine (1539.2 g) was sparged with air for about 60 min., during which time pH was measured. A calcium hydroxide slurry having 20% solids by weight was added drop wise after 60, 90 and 120 minutes (total weight of the calcium hydroxide slurry added of 13.5 g, 2.7 g dry basis) to the solution. The pH was monitored throughout the reaction and was initially allowed to fall, and was then adjusted to a pH of about 5 with the addition of calcium hydroxide after 60 minutes, and maintained at about a pH of 5 thereafter. The reaction was allowed to stir while the pH was maintained at about 5. Total reaction time was about 180 min. A white precipitate was collected, washed and weighed, providing a yield of about 95% recovery of silica and about 100% of iron.

3. Selective Removal of Silica Using Activated Alumina

A 50 mL brine solution having approximately 180 ppm dissolved silica was passed through a 2.5 cm diameter column filled to a depth of 20 cm and containing approximately 0.5 g activated alumina and about 1.2 g water. The silica preferentially adsorbed onto the alumina and was removed from solution. The activated alumina had a surface area of 300 m$^2$/g and a grain size of 8-14 mesh (~2 mm diameter). The total bed volume was about 102 mL. The temperature during the step of contacting the silica containing brine and the activated alumina was maintained between about 90 and 95° C.

The concentration of silica in the brine was monitored by measuring monomeric silica using the molybdate colorimetric method and using Atomic Absorption for total silica. Silica values were significantly lower in the exit solution due to adsorption of the silica on the activated alumina. Saturation of the activated alumina in the column was indicated by a sudden increase in silica concentration in the exit solution. A total loading of about 1.8% by weight of silica (as SiO2) on the activated alumina was achieved.

To regenerate the alumina for another cycle of silica removal, the alumina was first washed with 5 bed volumes of dilute water in order to remove salt solution remaining in the pores. This removed only a small amount of silica from the alumina. The alumina was then reacted with a dilute (0.1M) sodium hydroxide solution at a temperature of 50-75° C. until a desired amount of silica has been removed. The alumina was then rinsed with 2-3 bed volumes of dilute acid to prepare the surface for the next silica adsorption cycle.

4

To a brine solution comprising about 200 mg/L Li, 75,000 mg/L Na, 24,000 mg/L K, 39,000 mg/L Ca, 156 mg/L Sr; 834 mg/L Zn, 539 mg/L B, 219 mg/L Ba, 160 mg/L SiO$_2$, and 215,500 mg/L Cl and maintained at about 95° C. was added approximately 1.5% by weight aluminosilicate seed. To approximately 39 mL of the brine solution was added 1.07 mL of a 0.1M solution of AlCl$_3$ such that the ratio of SiO$_2$:Al was 1:1. About 0.45 mL of a 1N solution of NaOH was used to titrate the pH of the solution to about 5. The solution was heated and stirred for about 10 minutes to ensure complete precipitation of the aluminosilicate.

Analysis of both the feed and the output fluids during silica removal yielded mixed results. Comparing the results of molybdate blue calorimetry (MBC; useful for quantifying monomeric silica) and ICP-OES yielded silica levels that were significantly lower than input levels (160 mg/L).

As shown in Table 1, the results of several methods for the removal of silica from a brine solution were tested. Both Ca(OH)$_2$ and NaOH were investigated, as was NaOH along with a 10% excess of AlCl$_3$. For the use of an excess of AlCl$_3$, the additional AlCl$_3$ was added approximately 2 minutes after initiation of the reaction, and additional NaOH was titrated into the reaction mixture to maintain a pH of about 5. Finally, NaOH and polymerized aluminum in the form of aluminum chlorohydrate (PAC) was also investigated, instead of AlCl$_3$, and was prepared in situ by titrating NaOH into AlCl$_3$ until a pH of about 4.5 was achieved. Additional base was added to raise the pH to about 5.

Both Ca(OH)$_2$ and NaOH were effective in both increasing the pH of the solution, and in removing silica, with Ca(OH)$_2$ being slightly more effective at removing silica than NaOH, and removing at least about 80% of the silica present. Precipitation of silica by contacting with an excess of AlCl$_3$ resulted in the precipitation of nearly 87% of silica present. Finally, use of the PAC resulted in the removal of about 84% of the silica present.

TABLE 1

| | ICP | | MBC | |
|---|---|---|---|---|
| Test Condition | % SiO$_2$ remaining in solution | % SiO$_2$ removed | % SiO$_2$ remaining in solution | % SiO$_2$ removed |
| Ca(OH)$_2$ | 17.3 | 82.7 | 18.9 | 81.1 |
| NaOH | 27.9 | 72.1 | 19.8 | 80.2 |
| NaOH + 110% AlCl$_3$ | 16.3 | 83.8 | 13.0 | 87.0 |
| NaOH + PAC | 16.8 | 83.2 | 15.4 | 84.6 |

5. Aluminosilicate Seed Material Preparation

To enhance silica removal, an anhydrous aluminosilicate seed material can be added to the solution to which aluminum salt. The amorphous aluminosilicate material can be prepared by neutralizing a concentrated sodium silicate solution with aluminum chloride salt. Approximately 710 grams of Na$_2$SiO$_3$.9H$_2$O was added to 400 mL of deionized water, to which about 420 grams of AlCl$_3$.6H$_2$O was added, while stirring, to produce a wet paste of precipitated material. The precipitate was heated to 60° C. in a drying oven overnight. The dried powder was washed again with deionized water to remove fines to produce a solid material that provides a useful seed material for silica removal tests.

6. Silica Removal Process

Approximately 60 mL of brine containing about 160 mg/L silica at a pH of 5 was added to 1.07 g of amorphous aluminosilicate seed (~1.5 wt. % solids). Approximately 1.6 mL of a 0.1M solution of aluminum chloride (AlCl$_3$) was added to the brine solution. The solution was stirred, maintained at nominally 95° C., and the pH monitored. The pH dropped to about 2.7 upon addition of the AlCl$_3$ solution. Approximately 13 mL of a saturated and filtered Ca(OH)$_2$ solution was added. Silica and the aluminum salt formed precipitates, yielding a brine solution having a silica content of about 0.23 mg/mL.

As is understood in the art, not all equipment or apparatuses are shown in the figures. For example, one of skill in the art would recognize that various holding tanks and/or pumps may be employed in the present method.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these reference contradict the statements made herein.

As used herein, recitation of the term about and approximately with respect to a range of values should be interpreted to include both the upper and lower end of the recited range.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

I claim:

1. A method for removing silica from an aqueous brine solution that comprises silica, the method comprising the steps of:
    providing an aqueous brine solution that comprises silica and an iron (II) salt;
    oxidizing the iron (II) salt to iron (III) hydroxide, said oxidizing step comprises sparging the aqueous brine solution with air;
    maintaining the pH of the aqueous brine solution at between about 4.5 and 5.5;
    contacting the silica and the iron (III) hydroxide for a time sufficient for the silica to attach to the iron (III) hydroxide and form a silica/iron precipitate;
    separating the silica/iron precipitate from the aqueous brine solution;
    recovering an aqueous product stream from the separation step, said aqueous product stream having a reduced silica concentration relative to the aqueous brine solution;
    maintaining the pH of the aqueous product stream at between about 4 and 7;
    supplying the aqueous product stream to a column charged with activated alumina at a pH of between about 4 and 7 such that silica present in the aqueous product stream selectively binds to the activated alumina; and
    recovering a column product stream having a silica concentration of less than about 15 ppm.

2. The method of claim 1 wherein the aqueous brine solution is a geothermal brine.

3. The method of claim 1 wherein the iron (II) salt is iron (II) chloride.

4. The method of claim 1 wherein the pH of the aqueous brine solution is maintained at a predetermined pH by the addition of base.

5. The method of claim 1 wherein the pH of the aqueous brine solution is maintained at a predeteimined pH by the addition of base selected from calcium oxide or calcium hydroxide.

6. The method of claim 1 wherein the pH of the aqueous brine solution is maintained at between about 4.75 and 5.5.

7. The method of claim 1 wherein the pH of the aqueous brine solution is maintained at between about 4.9 and 5.3.

8. The method of claim 1 wherein the silica concentration of the aqueous product stream is less than 20 ppm.

9. The method of claim 1 further comprising supplying the aqueous product stream to means for recovering at least one metal selected from lithium, zinc and manganese from said aqueous brine solution.

10. The method of claim 1 wherein the column product stream has a silica concentration of less than about 10 ppm.

11. The method of claim 1 wherein the column product stream has a silica concentration of less than about 5 ppm.

12. The method of claim 1 wherein the said oxidizing step comprises sparging the aqueous brine solution with air for a period of at least 10 minutes.

13. The method of claim 1 wherein the said oxidizing step comprises sparging the aqueous brine solution with air for a period of at least 30 minutes.

14. The method of claim 1 wherein the molar ratio of iron (III) to silica is at least about 1:1.

15. The method of claim 1 wherein the molar ratio of iron (III) to silica is at least about 4:1.

16. The method of claim 1 wherein the molar ratio of iron (III) to silica is at least about 7:1.

17. The method of claim 1 further comprising adding flocculent to the aqueous brine solution.

18. The method of claim 1 further comprising regenerating the column charged with activated alumina.

19. The method of claim 1 further comprising a step of monitoring the column product stream to determine loading of the column charged with activated alumina.

20. The method of claim 1 further comprising supplying the aqueous product stream to at least two columns charged with activated alumina at a pH of between about 4 and 7 such that silica present in the aqueous product stream selectively binds to the activated alumina.

* * * * *